(12) United States Patent
Kim

(10) Patent No.: US 8,341,811 B2
(45) Date of Patent: Jan. 1, 2013

(54) SNAP RING FOR FISHING IMPLEMENTS

(75) Inventor: Young Gwan Kim, Busan (KR)

(73) Assignee: Sunwon Valve Co., Ltd., Busan (KR)

(*) Notice: Subject to any disclaimer, the term of this patent is extended or adjusted under 35 U.S.C. 154(b) by 65 days.

(21) Appl. No.: 12/949,547

(22) Filed: Nov. 18, 2010

(65) Prior Publication Data

US 2012/0073095 A1 Mar. 29, 2012

(30) Foreign Application Priority Data

Sep. 27, 2010 (KR) .................. 10-2010-0093016

(51) Int. Cl.
*F16B 45/04* (2006.01)
(52) U.S. Cl. .............. 24/600.7; 24/588.1; 24/588.11; 24/592.11; 24/594.1; 24/594.11; 24/595.1; 24/598.1; 24/599.1; 24/599.2; 24/599.6; 43/14
(58) Field of Classification Search ............... 24/588.1, 24/588.11, 592.1, 592.11, 594.1, 594.11, 24/595.1, 598.1, 598.2, 598.3, 599.1, 599.2, 24/599.3, 599.6, 600.7; 43/14
See application file for complete search history.

(56) References Cited

U.S. PATENT DOCUMENTS

| | | | | |
|---|---|---|---|---|
| 2,905,997 | A | * | 9/1959 | Ramskill .................... 294/82.22 |
| 3,810,592 | A | * | 5/1974 | Host ............................ 242/245 |
| 3,899,806 | A | * | 8/1975 | Berg .......................... 294/82.19 |
| 4,372,016 | A | * | 2/1983 | LaViolette et al. .......... 24/600.7 |
| 5,287,645 | A | * | 2/1994 | Gois ................................ 43/14 |
| D348,302 | S | * | 6/1994 | Gois ........................... D22/135 |
| 5,505,013 | A | * | 4/1996 | Gois ................................ 43/14 |
| 5,791,025 | A | * | 8/1998 | Maurice et al. ............ 24/582.11 |
| 6,694,574 | B1 | * | 2/2004 | Sheng ........................ 24/265 H |
| 6,793,046 | B2 | * | 9/2004 | Petzl et al. .................... 188/188 |
| 7,228,601 | B2 | * | 6/2007 | Thompson .................. 24/599.9 |
| 7,320,159 | B2 | * | 1/2008 | Petzl et al. ................... 24/599.5 |
| 7,475,456 | B2 | * | 1/2009 | Thompson .................. 24/599.9 |
| 2005/0133305 | A1 | * | 6/2005 | Okada et al. ................... 184/65 |
| 2007/0062705 | A1 | * | 3/2007 | Schats et al. ................. 166/379 |
| 2008/0184541 | A1 | * | 8/2008 | Jang et al. .................... 24/599.9 |
| 2008/0194373 | A1 | * | 8/2008 | Suzuki et al. ................. 475/230 |

* cited by examiner

*Primary Examiner* — Robert J Sandy
*Assistant Examiner* — David Upchurch
(74) *Attorney, Agent, or Firm* — Rabin & Berdo, P.C.

(57) ABSTRACT

A snap ring for fishing implements is provided. The snap ring includes a hook-like body having an opening on a portion thereof, a rotary shaft coupled on one side to a portion of the body such that the rotary shaft is rotatable around the opening, a hollow guide into which the rotary shaft is fitted and slides along, and a guide spring provided between the rotary shaft and the guide to elastically support the guide against the rotary shaft.

3 Claims, 3 Drawing Sheets (a)   (b)   (c)   (d)

SNAP RING FOR FISHING IMPLEMENTS

BACKGROUND

1. Technical Field

The present disclosure relates to a snap ring for fishing implements. More particularly, the present disclosure relates to a snap ring for fishing implements, in which a guide spring is mounted inside a guide, thereby facilitating its connection and disconnection in closing/opening modes and upon reception of an external impact, preventing a main latch from automatically disengaging from a body; an end of a rotary shaft, which is opposite to an end, into which a push button and a button spring are inserted, is closed, and one end of the body, to which a second roller shaft and a first roller shaft, respectively mounted on upper and lower portions of the body, are fastened, is also closed so as to secure strength, thereby even upon collision with a slipway, preventing it from being damaged; the upper and lower spaces of the body are sufficiently provided to receive something therein, thereby preventing a wire from getting jammed in the spaces; thrust bushings are mounted on opposite ends of a first roller, thereby even after a prolonged use, preventing the opposite ends of the first roller from being worn out; and an oil outlet is formed in the first roller shaft, thereby reducing a friction force applied between components.

2. Description of the Related Art

In fishing, fishing vessels use a very large fishing net in the sea. The very large fishing net has a great dimension in length and width, and is connected to a fishing vessel using a wire (see FIG. 5).

When the fishing net is thrown in the sea from the fishing vessel, or otherwise the thrown fishing net is drawn to the fishing vessel, a wire connected to the fishing vessel is used. Here, the fishing net is connected to the wire such that it is able to slide along the wire. In order to connect the fishing net to the wire, a hook-like part is required, which is generally called a snap ring.

In throwing or drawing in the fishing net in or from the sea, an operation should be carried out from the fishing vessel to wind or unwind the wire. Here, the fishing net is moved between the fishing vessel and the sea through a slipway. When the fishing net is cast in the sea, or drawn in to the fishing vessel, through the slipway, the snap ring connecting the wire and the fishing net collides with the slipway with a great quantity of impact.

A conventional snap ring is configured so that a main latch is hinge-coupled to a ring-shaped body, and has problems in that when the snap ring is operated to close or open, a great amount of force is needed, and when receiving an external shock in a closed state, it is easily opened. For example, when the snap ring collides with the slipway, the main latch automatically disengages from the body, frequently causing the fishing net to be disconnected from the wire.

Moreover, other problems arise in that when the snap ring collides with the slipway, the upper and lower portions of the body are subject to damage, in that the dimension of the upper and lower spaces of the body is so small that the wire is jammed in the spaces, and in that in order to lock the main latch, a great amount of force has to be applied in a downward direction from the body.

BRIEF SUMMARY

Aspects of the present disclosure are to provide a snap ring for fishing implements which is capable of facilitating its connection and disconnection in closing/opening modes and upon reception of an external impact, preventing a main latch from easily disengaging from a body, even upon collision with a slipway, preventing it from being damaged by improving the strength, preventing a wire from getting jammed inside the body, even after a prolonged use, preventing the opposite ends of a first roller from being worn out, and reducing a friction force applied between components and making for a smooth fishing environment.

In accordance with one aspect of the present disclosure, a snap ring for fishing implements includes: a hook-like body having an opening; a rotary shaft coupled on one side to a portion of the body such that the rotary shaft is rotatable around the opening; a hollow guide into which the rotary shaft is fitted and slides along; and a guide spring provided between the rotary shaft and the guide to elastically support the guide against the rotary shaft.

In an exemplary embodiment, the body may include, on an upper portion, a second roller, a second roller shaft inserted into the second roller, and a fixing pin fixing the second roller shaft to the body, wherein an end of the body to which the second roller shaft is coupled is a blind-hole in which one end portion is closed.

In an exemplary embodiment, the body may include, on a lower portion, a first roller, a pair of thrust bushings inserted into opposite ends of the first roller, a first roller shaft inserted into the first roller and the thrust bushings, a fixing pin fixing the first roller shaft to the body, and a grease nipple inserted into an end of the first roller shaft, wherein an end of the body to which the first roller shaft is coupled is a blind-hole in which one end portion is closed.

In an exemplary embodiment, the first roller shaft may have an oil path therein, and an oil outlet on an outer circumferential surface, the oil outlet being connected to the oil path.

In an exemplary embodiment, the rotary shaft may have on a lower portion a blind-groove in which one end portion is closed and into which a button spring and a push button elastically supported by the button spring are inserted.

According to embodiments, the snap ring for fishing implements has the following effects.

The guide spring is mounted inside the guide, thereby facilitating its connection and disconnection in closing/opening modes and upon reception of an external impact, preventing the main latch from automatically disengaging from the body.

Further, the end of the rotary shaft, into which the push button and the button spring are inserted, and one end of the body, to which the second roller shaft and the first roller shaft, respectively mounted on upper and lower portions of the body, are fastened, are formed with a blind-type groove or hole, in which one end side is closed, so as to secure the strength, thereby even upon collision with the slipway, preventing the snap ring from being damaged.

Furthermore, the upper and lower spaces of the body are sufficiently provided to receive something therein, thereby preventing the wire from getting jammed in the spaces; thrust bushings are mounted on opposite ends of the first roller, thereby even after a prolonged use, preventing the opposite ends of the first roller from being worn out; and the oil outlet is formed in the first roller shaft, thereby reducing a friction force applied between components.

BRIEF DESCRIPTION OF THE DRAWINGS

The above and other features of the present disclosure will become apparent from the detailed description of the following embodiments in conjunction with the accompanying drawings.

DETAILED DESCRIPTION

Figure 1:
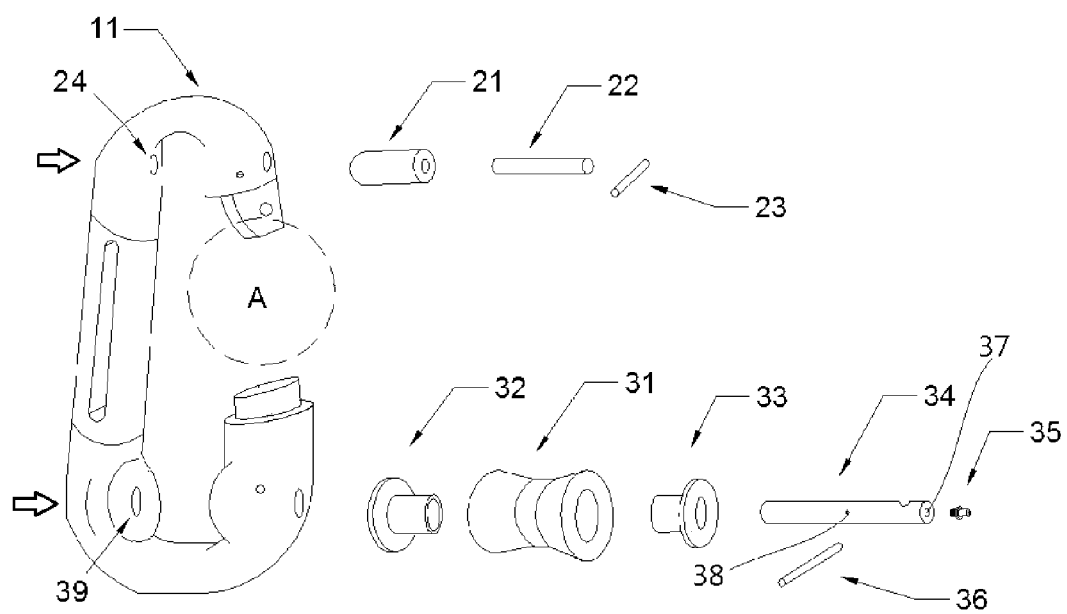
FIG. 1 is a perspective view illustrating a body of a snap ring for fishing implements according to an exemplary embodiment.

Exemplary embodiments of the present disclosure will now be described in detail with reference to the accompanying drawings. Throughout this document, reference should be made to the drawings, in which the same reference numerals and signs are used throughout the different drawings to designate the same or similar components. In the following description of the present disclosure, detailed descriptions of known functions and components incorporated herein will be omitted when they may make the subject matter of the present disclosure unclear. While the present disclosure will be described in conjunction with exemplary embodiments, it will be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the invention as defined by the appended claims.

Figure 2:
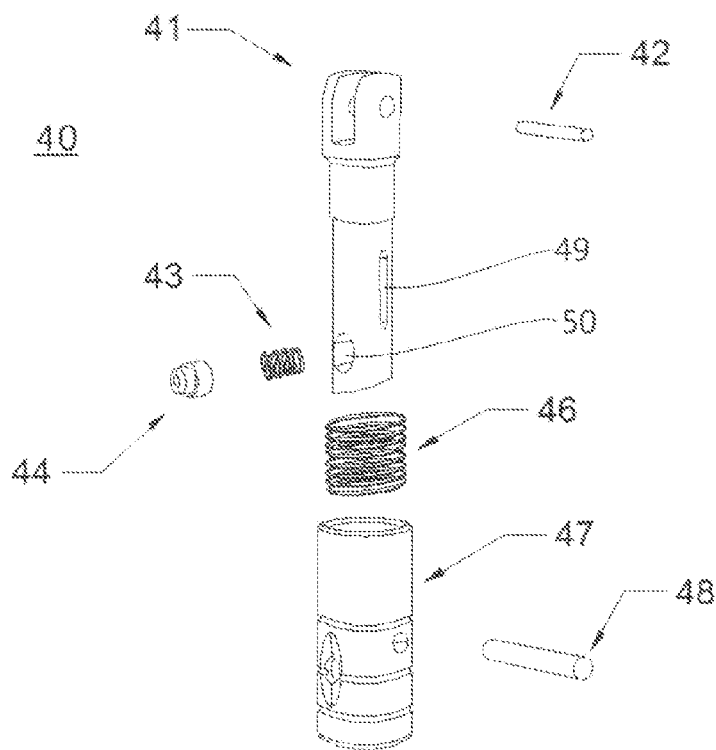
FIG. 2 is a perspective view illustrating a main body of the snap ring for fishing implements according to an exemplary embodiment.

FIG. 1 is a perspective view illustrating a body of a snap ring for fishing implements according to an exemplary embodiment, and FIG. 2 is a perspective view illustrating a main body of the snap ring for fishing implements according to an exemplary embodiment.

Referring to FIGS. 1 and 2, the snap ring for fishing implements includes a body 11 and a main latch 40. A second roller 21, a second roller shaft 22, a fixing pin 23, a first roller 31, thrust bushings 32 and 33, a first roller shaft 34, a fixing pin 36, and a grease nipple 35 are coupled to the body 11. The main latch 40 includes a rotary shaft 41, a guide 47, and a guide spring 46.

The body 11 is formed like a hook that has an opening A in a portion thereof. An upper portion of the body has a width smaller than that of a lower portion of the body. A wire (W in FIG. 5) passes through the space between the upper and lower portions of the body 11. Preferably, the space is of a larger volume (width) enough to pass through the wire, thereby preventing the wire from getting jammed in the space defined by the upper or lower portion of the body 11.

The second roller 21 is coupled to the upper portion of the body 11 in order to reduce a friction force arising between the wire and the body 11 when a fishing net is thrown or drawn in or from the sea. The second roller 21 is coupled to the body 11 by means of the second roller shaft 22. To this end, the second roller 21 is formed with a shape of a hollow into which the second roller shaft 22 is inserted. The second roller shaft 22 serves as a rotating axis of the second roller 21.

One end (left side end in FIG. 1) of the second roller shaft 22 is fitted into a groove of the body 11, and the other end (right side end in FIG. 1) of the second roller shaft is fixed to the body 11 by means of the fixing pin 23. Here, preferably, the former end of the second roller shaft 22 is not completely but partially fitted into the groove of the body. That is, one end of the body 11 to which the second roller shaft 22 is coupled is preferably a blind-hole 24 in which one end portion is closed (which is indicated by an arrow shown on the left and upper side in FIG. 1). This is for sufficiently securing the strength of the body 11, so that even when the snap ring collides with a slipway (SW in FIG. 5), the upper portion of the body 11 is prevented from being damaged.

The first roller 31 is coupled to the lower portion of the body 11 in order to reduce a friction force occurring between the wire and the body 11 when a fishing net is thrown or drawn in or from the sea. The first roller 31 is coupled to the body 11 by means of the first roller shaft 34. To this end, the first roller 31 is formed with a shape of a hollow into which the first roller shaft 34 is inserted. The first roller shaft 34 serves as a rotating axis of the first roller 31.

One end (left side end in FIG. 1) of the first roller shaft 34 is fitted into a groove of the body 11, and the other end (right side end in FIG. 1) of the first roller shaft is fixed to the body 11 by means of the fixing pin 36. Here, preferably, the former end of the first roller shaft 34 is not completely but partially fitted into the groove of the body. That is, like the upper portion of the body 11 to which the second roller shaft 22 is coupled, one end of the lower portion of the body 11 to which the first roller shaft 34 is coupled is preferably a blind-hole 39 in which one end portion is closed (which is indicated by an arrow shown on the left and lower side in FIG. 1). This is for sufficiently securing the strength of the body 11, so that even when the snap ring collides with the slipway (SW in FIG. 5), the lower portion of the body 11 is prevented from being damaged.

The pair of thrust bushings 32 and 33 is inserted into the opposite ends of the first roller 31. The thrust bushings 32 and 33 are disposed between the first roller 31 and the body 11, so that even after a prolonged use of the snap ring, they reduce the friction force resulting from coming into contact with the body 11 when the first roller 31 rotates, thereby preventing the opposite ends of the first roller 31 from being worn out.

The grease nipple 35 is inserted into an end of the first roller shaft 34. The first roller shaft 34 has an oil path 37 in the inside thereof, and an oil outlet 38 on an outer circumferential surface, which oil outlet is connected to the oil path 37.

In order to inject oil into the oil path 37 of the first roller shaft 34, the grease nipple 35 is drawn out from the first roller shaft and then oil is injected. When the injection of oil is completed, the grease nipple 35 covers in the end of the oil path 37. Oil injected into the oil path 37 is discharged out of the oil outlet 38 and reduces the friction force arising between the first roller 31, the thrust bushings 32 and 33, the lower portion of the body, and the first roller shaft 34.

In FIG. 2, the main latch 40 is disposed in the opening A of the body 11 (also see FIG. 1), and includes the rotary shaft 41, the guide 47, and the guide spring 46.

One end (an upper end in FIG. 2) of the rotary shaft 41 is coupled to the upper portion of the body 11 such that it is rotatable in the opening A of the body 11, and the other end (a lower end in FIG. 2) is inserted into the guide 47. The upper portion of the rotary shaft 41 is provided with a hole through which a fixing pin 42 is coupled, and the lower portion of the rotary shaft 41 is provided with a blind-groove 50 in which one end portion is closed and into which the button spring 43 and a button 44 are coupled. A slide guide slot 49 is formed between the hole and the groove 50 and through which a guide pin 48 is inserted.

The guide spring 46 is inserted between the rotary shaft 41 and the guide 47. The guide spring 46 elastically supports the guide 47 against the rotary shaft 41, so that when one tries to open the body 11, he pushes up the guide 47 against the rotary shaft, and when he tries to close the body 11 in that state, he releases his hold of the pushed-up guide 47 against the rotary shaft 41. Thus, the guide spring 46 being mounted between the rotary shaft 41 and the guide 47 facilitates the connection and disconnection of the snap ring in its closing/opening modes and upon reception of an external impact, prevents the main latch 40 from automatically disengaging from the body 11.

Figure 3:
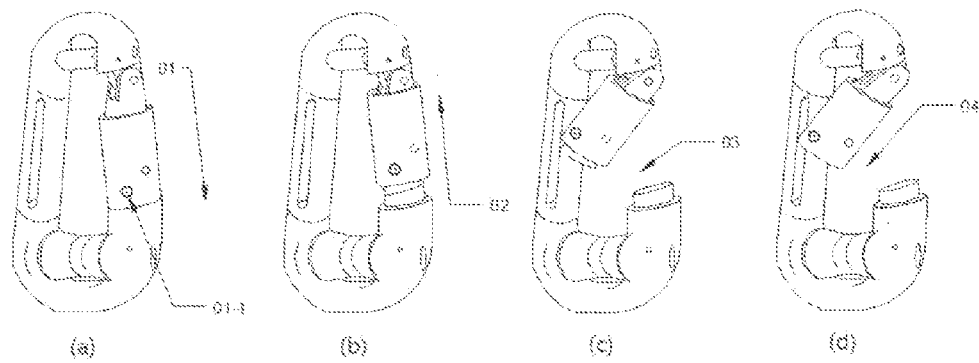
FIGS. 3 and 4 are views explaining the operation of the snap ring for fishing implements according to an exemplary embodiment.
Figure 4:
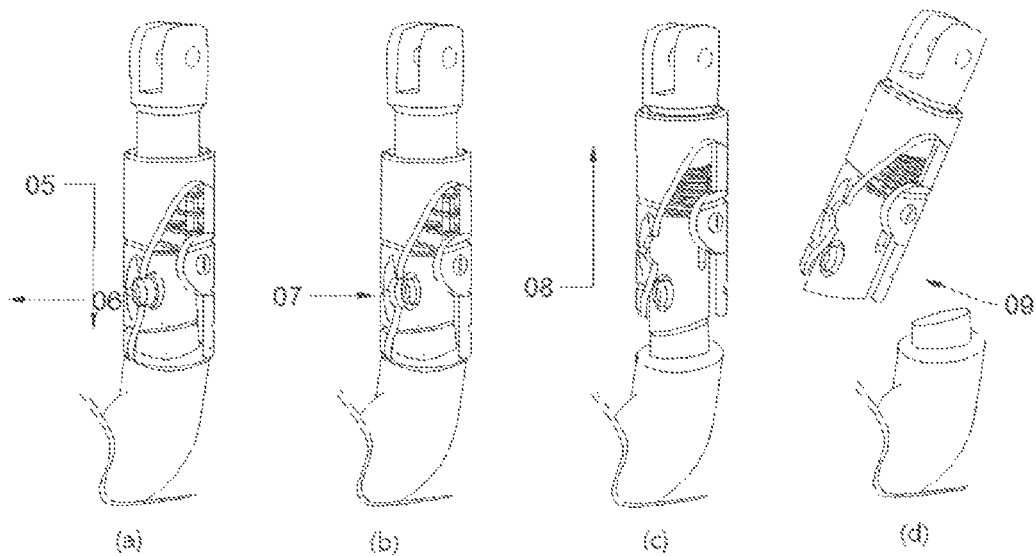

FIGS. 3 and 4 are views explaining the operation of the snap ring for fishing implements according to an exemplary embodiment, wherein FIG. 3 shows the entire snap ring for fishing implements, and FIG. 4 shows the main latch in detail in the snap ring for fishing implements.

The opening operation of the snap ring will now be described.

First, when the push button is pressed as shown in FIG. 3A (step 01-1), and then the guide is pushed up as shown in FIG. 3B (step 02), the lower end of the rotary shaft is exposed to outside. Then, when the rotary shaft is rotated as shown in FIGS. 3C and 3D (steps 03 and 04), then the snap ring is being into an opening mode in which the snap ring can be easily opened.

On the contrary, in order to manipulate the snap ring to have a closing mode, when the rotary shaft is manipulated to rotate to its original position and the guide is slightly pushed up and unhanded, the guide is pushed down by a restoring spring force of the spring, closing the body (step 01 in FIG. 3A).

The opening operation of the snap ring will now be described with reference to FIG. 4 in which the main latch is illustrated in detail.

When the push button is pressed (step 07 in FIG. 4B) and the guide is pushed up (step 08 in FIG. 4C), the lower end of the rotary shaft is exposed to the outside. Here, the guide spring is compressed. Then, when the rotary shaft is rotated, the snap ring is being into an opening mode (step 09 in FIG. 4D).

On the contrary, in order to manipulate the snap ring to have a closing mode, after the guide is pushed up and the lower end of the rotary shaft is exposed to the outside, when the rotary shaft is aligned with the body and the guide is unhanded (step 05 in FIG. 4A), the guide is pushed down and is automatically fastened to the rotary shaft so that the push button returns to its original position and protrudes from the guide (step 06 in FIG. 4A). Here, the guide spring is restored to its original state.

Figure 5:
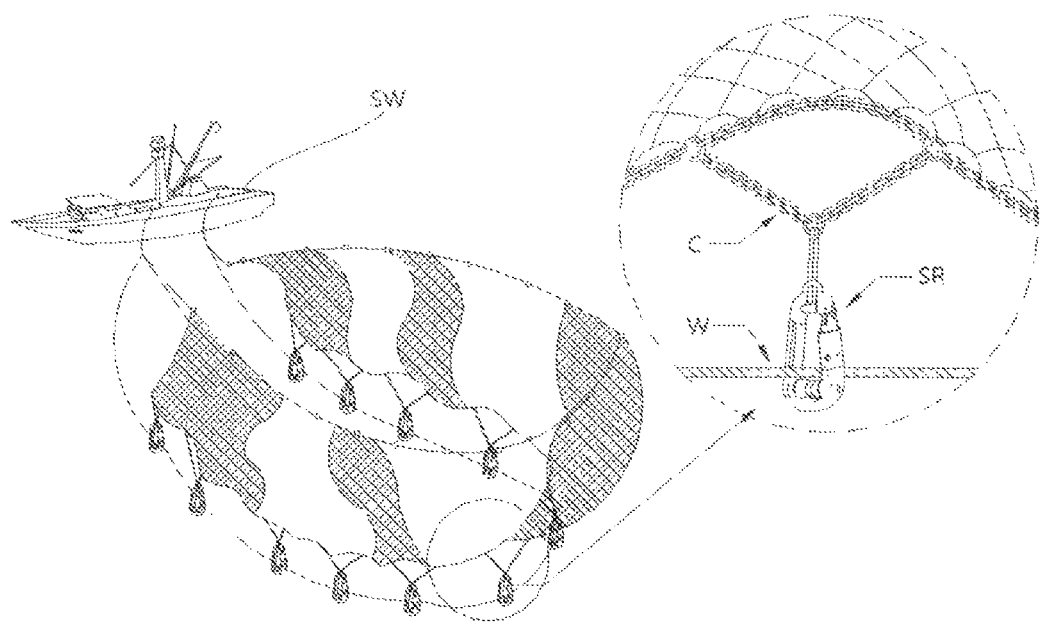
FIG. 5 is a view illustrating an example of application of the snap ring for fishing implements according to an exemplary embodiment.

FIG. 5 is a view illustrating an example of the snap ring for fishing implements being adapted to a fishing vessel according to an exemplary embodiment.

Opposite ends of the wire W are connected to the fishing vessel, which has means for winding and unwinding the wire W. A chain C is threaded through the lower border of the fishing net, and the snap ring SR is fastened to the chain via a rope or the like. That is, the wirer W and the chain C are connected to each other by the snap ring SR.

When the fishing net is thrown or drawn in or from the sea, the fishing net passes through the slipway SW. Here, the snap ring SR collides with the slipway SW with a great amount of impact. According to the snap ring of the embodiments, the guide spring is mounted between the rotary shaft of the main latch and the guide, so that the snap ring is kept in a firmly closed state. Thus, even when the snap ring SR collides with the slipway SW, the snap ring is hard to come into an opening mode. Further, the ends of the body, to which the second roller shaft and the first roller shaft are coupled, are blind-holes in which one end portion is closed, improving the strength of the body, so that even when the snap ring collides with the slipway, the body is prevented from being damaged.

The present disclosure is widely applicable to a field of manufacturing fishing implements, particularly a snap ring.

Although some embodiments have been described in the present disclosure, it should be understood that the embodiments are given by way of illustration only and do not limit the scope of the present disclosure, and that various modifications and changes can be made by a person having ordinary knowledge in the art without departing from the spirit and scope of the present disclosure, which are limited only by the accompanying claims and equivalents thereof.

What is claimed is:

1. A snap ring for fishing implements, the snap ring comprising:
a body having a hook-like shape and an opening on a portion thereof;
a rotary shaft coupled on one side to a portion of the body, the rotary shaft being rotatable around the opening;
a guide into which the rotary shaft is fitted and slides along; and
a guide spring provided between the rotary shaft and the guide, the guide spring being configured to elastically support the guide against the rotary shaft,
wherein the body includes:
a first roller;
a pair of thrust bushings inserted into opposite ends of the first roller;
a first roller shaft inserted into the first roller and the thrust bushings;
wherein the first roller shaft includes:
an oil path formed in the inside of the first roller shaft; and
an oil outlet formed on a circumferential surface of the first roller shaft, the oil outlet being a through hole configured to connect the oil path and the circumferential surface of the first roller shaft, a fixing pin configured to fix the first roller shaft to the body; and
a grease nipple inserted into an end of the first roller shaft, and
wherein an end of the body to which the first roller shaft is coupled has a blind-hole of which one end portion is closed.

2. The snap ring for fishing implements according to claim 1, wherein the body includes, on an upper portion, a second roller, a second roller shaft inserted into the second roller, and a fixing pin configured to fix the second roller shaft to the body, wherein an end of the body to which the second roller shaft is coupled has a blind-hole of which one end portion is closed.

3. The snap ring for fishing implements according to claim 1, wherein the rotary shaft has on a lower portion a blind-groove of which one end portion is closed and into which a button spring and a push button elastically supported by the button spring are inserted.

* * * * *